July 26, 1966   M. C. MERELIS   3,262,736
INFANT'S CAR SEAT

Filed Oct. 1, 1964   2 Sheets-Sheet 1

Inventor:
Morris C. Merelis,
by Arthur D. Thomson
Attorney

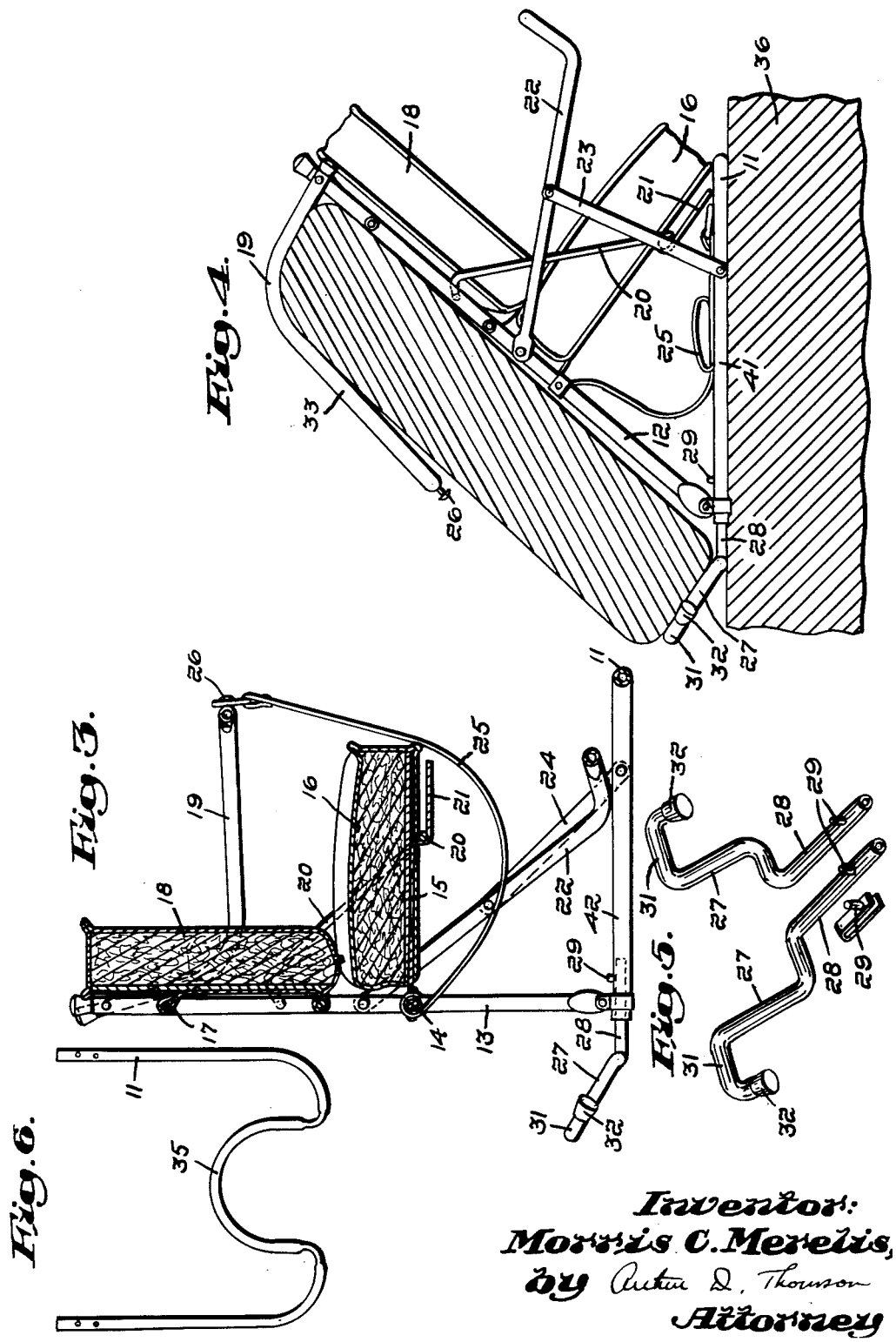

United States Patent Office 3,262,736
Patented July 26, 1966

3,262,736
INFANT'S CAR SEAT
Morris C. Merelis, Brookline, Mass., assignor to Rose-Derry Company, Newton, Mass., a corporation of Massachusetts
Filed Oct. 1, 1964, Ser. No. 400,849
3 Claims. (Cl. 297—253)

This invention relates to improvements in infants' seats or chairs, and pertains more particularly to a portable and collapsible car seat which may be installed and removably secured on and across the divided front seats of an automobile, as well as in the center of one divided front seat or in any desired location of an undivided automobile seat.

Infants' car seats of this general type, as heretofore provided, have usually comprised a base member having a continuous transverse back bar which is tucked under the back of the standard seats of an automobile. Such car seats are suitable for location on an undivided automobile seat or at the center of one of the divided automobile seats; but are unsuitable for location in a position to span the divided front seats of an automobile, because the usual side hinges of such divided seats would interfere with the continuous cross bar at the back of the base of the infant's car seat.

It is accordingly the principal purpose of the invention to provide an infant's car seat which may be located on and across the space between the divided seats of the automobile with adequate security for the removable car seat and adequate safety for the infant seated thereon; and which may also be used as an infant's chair in the home.

A more specific object of the invention is to provide such a car seat with spaced rearwardly projecting ear members adapted to be tucked under the respective back cushions of the divided automobile seats; said clamp members being removably and adjustably connected to the base of the infant's car seat, so that the car seat will be secured on and across the divided automobile seats irrespective of the normal width of the space between them.

Other objects and advantages of the improved car seat will be apparent from the following description of the recommended embodiments of the invention illustrated on the accompanying drawings. It will be understood, however, that the structural details of the embodiments herein illustrated and described may be varied without departing from the essence of the invention, as set forth in the appended claims.

In the drawings:

FIG. 3 is a central section, with parts in elevation, of the car seat as shown in FIG. 1;

FIG. 4 is an end view of the car seat as shown in FIG. 1, tilted forwardly to permit the back of the automobile seat to be swung forwardly;

FIG. 5 is a detail view of the removable ear members, and an insertable spring stud for holding them in adjusted position in the tubular base of the car seat; and FIG. 6 is a plan view of a modified seat base.

Figure 1:
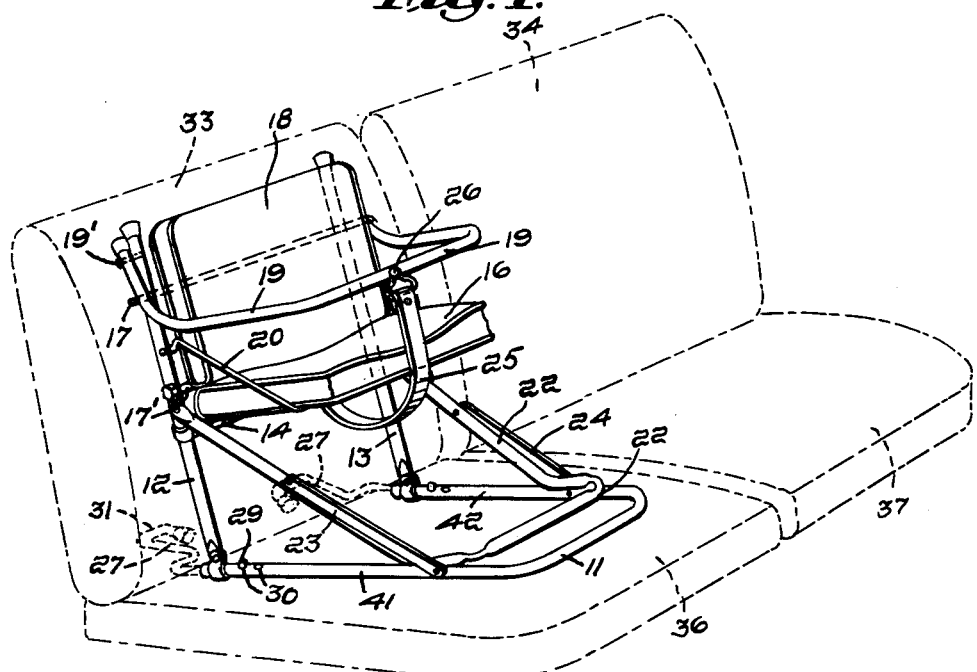
FIG. 1 is a perspective view of one form of the improved car seat, as located on one of a pair of divided front seats of an automobile.

The embodiment chosen for the purpose of illustration in FIGS. 1 to 5 comprises a generally U-shaped base 11, preferably made of tubular metal, and having spaced, parallel side sections 41 and 42; upright back members 12 and 13 pivoted to the respective side sections of the base; a transverse brace 14 secured to the uprights and providing a pivotal support for the frame 15 for the seat cushion 16 of the car seat; transverse back bars 17 and 17' passing through the uprights and providing a brace for the back cushion 18 of the car seat; the bar 17 having outwardly projecting ends providing stops limiting the downward movement of a U-shaped infant-enclosing arm rest 19 pivoted to the uprights at 19'; a U-shaped brace 20 for the seat frame 15, pivotally connected to the the uprights and removably received above an arm 21 projecting forwardly of the bottom of frame 15 in spaced parallel relation thereto; a U-shaped locking bar or brace 22, also pivotally connected to the uprights; links 23 and 24 pivotally connecting the locking bar to the base 11; and a crotch strap 25 suitably fixed to the transverse brace 14 and detachably connected to a button 26 on the front center of the arm rest 19.

Figure 2:
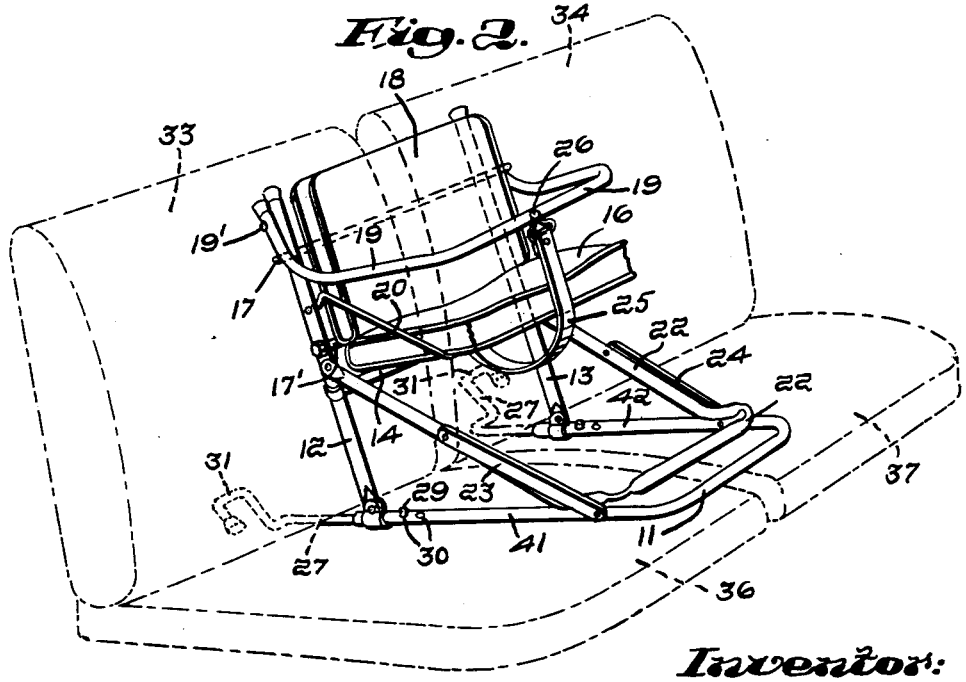
FIG. 2 is a similar view showing the car seat bridging the space between the divided seats of the automobile.

When the infant's car seat is erected and the locking bar is pressed downwardly to the position shown in FIGS. 1, 2 and 3, it passes the dead centers of the pivoted links 23, 24 and thus locks the seat in erected position. The lock is easily released by manually lifting the bar.

In accordance with this invention, the ear members, generally indicated at 27, have tubular shank portions 28 (FIG. 5) telescoped into the rearward open ends of the side sections 41 and 42 respectievly of U-shaped base 11, and removably secured therein by spring-pressed studs 29 received in one of a plurality of spaced holes 30 in the respective ends of the base sections. The outer end portions 31 of the ears are offset and inclined upwardly with respect to the axis of the shank portions 28, and are bent into hook shape; and their extreme ends may be capped with crutch tips 32. Similar caps may be applied to the upper ends of the uprights 12, 13 and to the ends of the U-shaped arm rest 19, as shown.

The removable and adjustable connection between the ear members 27 and the base 11 not only permits the effective length of the clamp to be adjusted according to the thickness of the back cushion of the automobile, but also permits the position of the ears to be interchanged so that they project inwardly (FIG. 1) or outwardly (FIG. 2) relative to the side sections 41, 42 of the U-shaped base 11. The outward position of the clamps is particularly desirable when the space between the divided front seats 33 and 34 of the automobile is relatively wide.

When the automobile has a so-called floor shift lever between the seats, the front of the U-shaped base preferably has a rearwardly curved loop portion 35, as shown in the modification of FIG. 6, to accommodate movement of the shift lever.

As previously indicated, the improved infant's car seat may be installed on one of the divided front seats 35 of an automobile, as shown in FIG. 1, when the ear members 27 are preferably positioned inwardly; or the car seat may be installed on and across the space between the divided automobile seat cushions 36, 37, as shown in FIG. 2, when the removable ear members may be positioned inwardly or outwardly depending upon the space between the divided seats.

The ear members are tucked into the space between the seat cushion and the hinged back cushion of the automobile, and the upward inclination of the clamps serves to retain the car seat in proper position for comfortable and protective seating of infant therein. Being spaced a substantial distance from each other, the clamp members will straddle the usual hinges at the sides of the automobile back cushions, without interference therewith, so that the uprights of the erected car seat will be securely braced against said back cushions.

When the car seat is located across the space between the divided seats (FIG. 2) seating space is afforded for the driver and another passenger.

When it is necessary to tilt down the back cushion of one of the divided automobile seats to permit entrance or egress to the back seat of a two-door automobile, the car seat may be partially collapsed, as shown in FIG. 4 by swinging the locking bar 22 upwardly, and then pressing the seat back 18 and the uprights 12, 13, to which the seat back may be suitably attached at the cross bars 17 and 17', forwardly and downwardly.

In order to collapse the removed car seat for packaging, transportation or storage, the pivoted arm rest 19 may be swung over the top of the seat, the locking bar is released as aforesaid, and the base 11, locking bar 22, the seat cushion 16 and seat frame 15 may be swung upwardly toward the seat back 18, to provide a compact bundle.

It will be apparent that the improved car seat may be erected for use as an infant's chair in the home, for it may be placed on the floor or on a house chair, as well as upon an automobile seat.

I claim:

1. A portable infant's car seat adapted for installation on and across the space between the divided seats of an automobile, and comprising a base member having spaced parallel side sections and ear members projecting rearwardly from said respective sections, the ear members being spaced substantially from each other and being inclined upwardly with respect to the axis of the side sections of the base member, said base member consisting of a U-shaped tube, and said ear members being removably received in the ends of tubular side sections thereof, and means for securing the ear members in adjusted lengthwise position relative to said side sections, said ear members comprising shank portions received in the ends of the respective tubular side sections, and outer end portions offset laterally from the axes of said respective shank portions, and said means being adapted to secure said shank portions with said offset end portions extending laterally either inwardly or outwardly relative to said axes.

2. A portable infant's car seat adapted for installation on and across the space between the divided seats of an automobile, and comprising a base member having spaced parallel side sections and ear members projecting rearwardly from said respective sections, the ear members being spaced substantially from each other and being inclined upwardly with respect to the axis of the side sections of the base member, said base member consisting of a U-shaped tube, and said ear members being removably received in the ends of tubular side sections thereof, and means for securing the ear members in adjusted lengthwise position relative to said side sections, said ear members comprising shank portions received in the ends of the respective tubular side sections, and outer end portions offset laterally from the axes of said respective shank portions, and said means being adapted to secure said shank portions with said offset end portions extending laterally either inwardly or outwardly relative to said axes, the front portion of said base member having a rearwardly looped portion, to accommodate movement of a shift lever located in the space between said divided seats.

3. A portable, collapsible infant's car seat adapted for installation on and across the space between the divided seats of an automobile, and comprising a U-shaped tubular base member having spaced, parallel side sections, a pair of substantially parallel upright back members pivotally attached to the respective side sections, bracing means pivotally connected to said side sections and to said uprights, seat frame pivotally connected to said uprights, a generally U-shaped arm rest pivotally connected to said uprights, and removable ear members projecting rearwardly from the side sections of the base member and adapted to be tucked under the respective back cushions of said divided seats, said ear members being spaced substantially from each other and being inclined upwardly with respect to the axes of said side sections, said ear members having shank portions slidably received in the respective tubular side sections, and means for securing said shank portions in lengthwise adjusted position, within said side sections, said tubular base member having a front section connecting said side sections, and said front section having a central, rearwardly looped portion, to accommodate movement of a shift lever located in the space between the divided seats of the automobile.

References Cited by the Examiner

UNITED STATES PATENTS

| | | | |
|---|---|---|---|
| 482,701 | 9/1892 | Snow | 108—99 |
| 1,216,287 | 2/1917 | Corbin | 247—256 |
| 2,276,857 | 3/1942 | Muller | 297—253 |
| 2,317,894 | 4/1943 | Doty | 297—253 |
| 2,605,811 | 8/1952 | Zoranovich | 297—253 |
| 2,676,026 | 4/1954 | Groldman | 280—36 |
| 2,704,567 | 3/1955 | Anderegg | 297—253 |
| 2,848,036 | 8/1958 | Campbell | 297—253 |
| 2,888,061 | 5/1959 | Berlin | 297—256 |
| 3,000,645 | 9/1961 | Schmidt | 280—39 |
| 3,062,583 | 11/1962 | Hamilton | 297—254 |
| 3,170,727 | 2/1965 | Peterson | 297—253 |

FOREIGN PATENTS 659,496  10/1951  Great Britain.

FRANK B. SHERRY, *Primary Examiner.*

F. K. ZUGEL, *Assistant Examiner.*